US006794011B2

(12) United States Patent
Allard

(10) Patent No.: US 6,794,011 B2
(45) Date of Patent: Sep. 21, 2004

(54) DECORATIVE ATTACHMENT FOR INCREASING VISIBILITY OF SCREEN DOORS

(76) Inventor: Catherine Allard, 849 Principale, St-Sauveur-des-monts, QC (CA), J0R 1R2

( * ) Notice: Subject to any disclaimer, the term of this patent is extended or adjusted under 35 U.S.C. 154(b) by 3 days.

(21) Appl. No.: 10/270,894

(22) Filed: Oct. 15, 2002

(65) Prior Publication Data

US 2004/0071929 A1 Apr. 15, 2004

(51) Int. Cl.[7] .................................................. B32B 3/00
(52) U.S. Cl. ........................................... 428/99; 160/10
(58) Field of Search ......................... 428/99, 68; 245/1, 245/2; 160/10

(56) References Cited

U.S. PATENT DOCUMENTS

| | | | | | |
|---|---|---|---|---|---|
| 697,106 | A | | 4/1902 | Schofield | |
| 1,749,755 | A | * | 3/1930 | Downer | 245/2 |
| 1,764,398 | A | | 6/1930 | Fitzgerald | |
| 2,487,830 | A | | 11/1949 | Robbins | |
| 3,261,393 | A | | 7/1966 | Temelezon | |
| 3,308,875 | A | | 3/1967 | Abrams | |
| 4,163,817 | A | | 8/1979 | DiCarlantonio | |
| 4,760,980 | A | | 8/1988 | Sharpe | |
| 5,730,196 | A | * | 3/1998 | Frament | 160/90 |
| 6,017,608 | A | | 1/2000 | Braun | |

* cited by examiner

*Primary Examiner*—Alexander S. Thomas

(57) ABSTRACT

A decorative attachment to improve visibility of screen doors in order to prevent inadvertent walk-through and resultant injury to persons or damage to the screen.

6 Claims, 1 Drawing Sheet

DECORATIVE ATTACHMENT FOR INCREASING VISIBILITY OF SCREEN DOORS

BACKGROUND OF THE INVENTION

1. Field of the Invention

The present invention relates to attachments for screen doors and, more particularly, to improved decorative safety attachments for placement on ordinary screen doors. The attachments improve the overall visibility of the screen and thereby prevent inadvertent walk-through and resultant injury to persons or damage to the screen.

2. Description of the Background

Over the years, numerous products have been developed for the purpose of enhancing the visibility of screen doors. However, most of these products offer rather complicated attachment means which can quite often damage the screen itself such as the use of screws or large pins that are much larger that the spacing between the screen wires. Other methods are time consuming since they involve weaving the decorative object into place.

U.S. Pat. No. 6,017,608 has a long exposé relating to a number of patents and commercially available products, citing, among other things problems with decorative devices that need to be connected to both sides of the screen; sagging of the screen by heavy decorative objects; as well as deformation of the screen by rather bulky attachment means. Damage and deformation is even more the case when involving the more fragile vinyl coated glass yarn screens.

SUMMARY OF THE INVENTION

It is, therefore, an object of the present invention to provide a decorative safety attachment for screen doors to improve visibility and thereby prevent inadvertent walk-through.

It is still another object of the present invention to provide an aesthetically-pleasing and visibility-enhancing decorative attachment which can be conveniently attached to and removed from screen doors.

It is still another object of the present invention to provide for removal of the device without producing damage to the screening.

It is still another object of the present invention to provide a device having light emitting properties and/or sound emitting properties which are coupled to proximity detectors to further enhance its presence when an individual approaches.

It is still another object of the present invention to provide an improved decorative safety attachment for screen doors which is suitable for use on either metal wire or vinyl coated glass yarn type screening.

It is a final object of the present invention to provide an improved decorative safety attachment for screen doors which is durable and weather-proof to accommodate outside use in a variety of climatic conditions.

In order to do so, the decorative attachment device comprises a main body configured and sized for visibility as well as aesthetic features and, attached to the main body are extensions than are long, thin and pliable so that they can be easily inserted through the mesh of a screen. For additional stability, the long extensions can also be bent on the opposite side of the screen in order to lock-in the decorative attachment device. Although the decorative attachment is mostly concerned with screen doors, it should be obvious that they can be installed on all screens whether they are for windows or other partition screens of one type or the other.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENT

Figure 1:
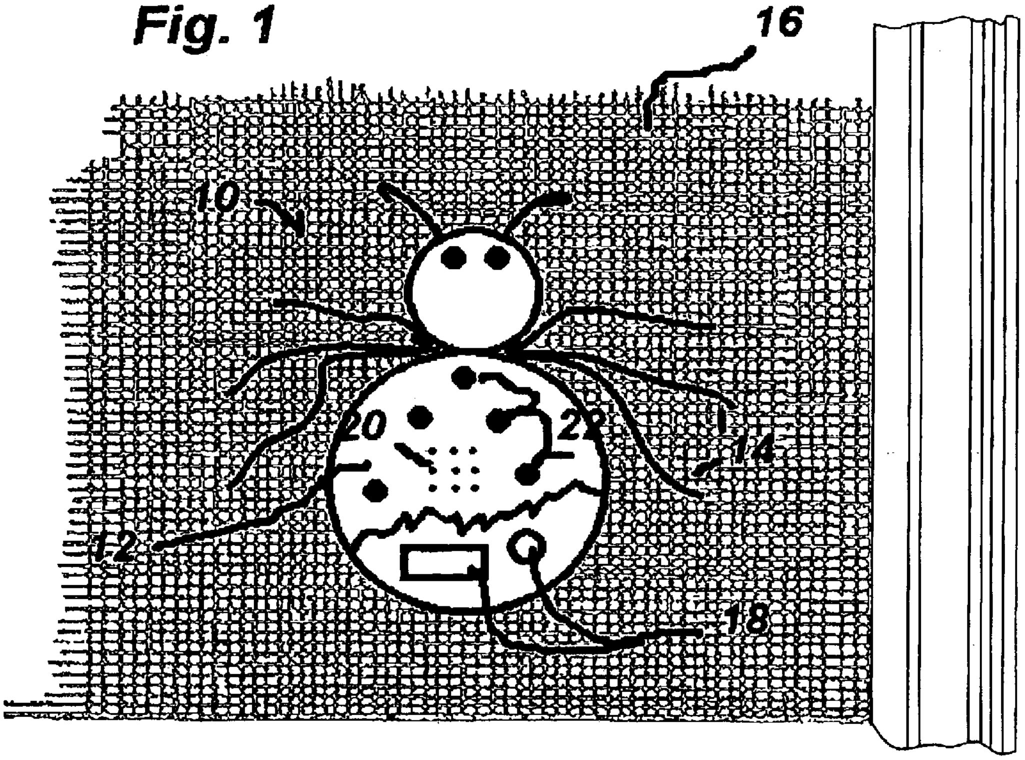
FIG. 1 is a front elevation illustrating the object installed on a screen.

FIG. 1 The decorative attachment (10) having a body (12) and extensions (14) is installed on a screen (16). For decorative purposes the body can take on the shape of an insect or animal with the extensions acting as legs, antennas or tentacles. Within the body (12) can be found electronic components (18) to detect motion and respond by either one or both audio and visual (lights) means. By way of a speaker (20) or LEDs (22). These electronic components (18) are not essential but can be added to premium devices at additional costs.

Figure 2:
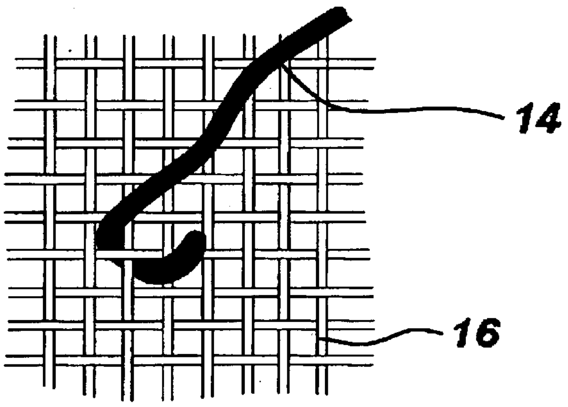
FIG. 2 is a detail of an extension bent to further increase stability.

FIG. 2 The extensions (14) are made of a pliable resilient material for repeated bending. By giving a small bend to the extensions (14) one can secure the decorative attachment (10) onto the screen (16).

What is claimed is:

1. A decorative attachment for increasing visibility to screens having at least one extension being inserted through a screen mesh and wherein said extension being made of a pliable resilient material for repeated bending, said decorative attachment having the following improvement: electronic components embedded within said decorative attachment to detect motion and provide a response means to detection.

2. A decorative attachment for increasing visibility to screens as described in claim 1 wherein:

said response means to detection being an audio cue.

3. A decorative attachment for increasing visibility to screens as described in claim 1 wherein:

said response means to detection being a visual cue.

4. A decorative attachment for increasing visibility to screens as described in claim 1 wherein:

said response means to detection being both an audio and a visual cue.

5. A decorative attachment for increasing visibility to screens as described in claim 3 wherein:

said visual cue being via an LED source.

6. A decorative attachment for increasing visibility to screens as described in claim 5 wherein:

said visual cue being via an LED source.

* * * * *